3,115,197
METHOD OF LOGGING WELLS
Delmar H. Larsen, West Hollywood, Calif.
(9157 Sunset Blvd., Suite 209, Los Angeles, Calif.)
No Drawing. Filed Jan. 16, 1961, Ser. No. 82,670
8 Claims. (Cl. 175—50)

This invention relates to improvements in logging wells drilled with drilling muds, and methods of improving the properties of such muds, so as to obtain better logs.

In recent years resistivity logging of wells has become increasingly more common. Most generally, this technique is applied to wells drilled in search of oil or gas, although it is on occasion applied to other wells, such as those drilled for stratigraphic information, sulphur mining, water wells and the like. Most frequently, this logging technique is applied to wells which have been drilled by the employment of a drilling fluid, commonly an aqueous drilling fluid. The logging method comprises determining the apparent electrical resistivity of the formation exposed by the bore hole, generally at a number of depths, and most frequently continuously over an interval of depth, which may be substantial, such as hundreds or thousands of feet. Techniques differ in details, but all employ a sensing device which is lowered in the well and moved throughout the interval desired to be logged, the sensing device being capable of determining and registering an ohmic resistance at the point or section where it is placed. A plotting of the resistivity values thus obtained is generally made and is referred to as an electrical resistivity log or simply a resistivity log of the well or bore hole in question. Usually, such logs are made with the hole filled with the drilling fluid which has been used in drilling the well, although some forms of sensing elements are able to make direct contact with the walls of the bore hole and do not require the presence of fluid in the hole at the time the determination is made.

In drilling a well, especially when the rotary method is employed, wherein the hole is kept filled with a drilling fluid, it is necessary to maintain a superior hydrostatic pressure within the hole, as compared to the fluids in the formation. This leads to filtration of the fluid phase of the mud into the formation. While much effort has been expended in recent years toward reducing this invasion of filtrate by making the mud difficult of filtration as by treatment with various colloids and the like, there is nevertheless always some filtration. Additionally, in many wells in which resistivity logs are run, no special effort may have been made prior to running the log, in keeping the filtration from the mud to a low value.

In resistivity logging of the type described, an important parameter to be measured is the resistivity of the formation itself, which of course is not directly accessible except at the wall of the bore hole. The results obtained are thus influenced by any changes to which the formation may have been subjected immediately surrounding the bore hole. Unfortunately, most drilling fluids yield a filtrate which has a different resistivity from that of the fluid in the well itself. This effect is more commonly evident and troublesome where the formation fluid in question is brine, that is, water with some burden of dissolved salts, and the mud is an aqueous drilling fluid, yielding a filtrate of higher resistivity than the formation brine.

Some attempts have been made in the past to adjust the resistivity of muds in a downward direction in order to obtain better electrical logs, but these are generally unsuccessful (unless they take the form of providing special muds with heavy additions of organic materials and the like), because any substantial lowering of mud resistivity by simple addition of electrolyte results in flocculation of the mud with a consequent increase in viscosity and shear strength, and an increase in the filter loss. An increase in the filter loss is the very thing to be avoided under the circumstances, since the filter loss of the mud determines the degree of invasion for a given time interval between drilling and logging.

An object of the present invention is to provide a simple method for reducing mud filtrate resistivity without the generally concomitant disadvantages.

Another object of the invention is to provide a new process of logging, comprising treatment of drilling mud followed by running the log, whereby superior logs result.

Other objects of the invention will appear as the description thereof proceeds.

In accordance with an illustrative embodiment of the invention, I treat the aqueous drilling mud of a well about to be logged with sufficient lithium citrate or one of its equivalents for the purpose of this invention, as noted hereinbelow, to reduce mud filtrate resistivity to a proper value, taking into consideration the known or expected formation fluid resistivity.

In general, resistivity of the mud filtrate, as measured at 75° F., will be lowered to between 1.5 and 0.2 ohm meters, this requiring a treatment of from about 2% to about 6 to 8% by weight of lithium citrate, for example, on the drilling fluid. Remarkably, and quite in contrast with common oil field experience, the addition of this electrolyte is without substantial deleterious effects upon the properties of the drilling mud, especially as regards viscosity, gel strength, and filter loss.

The filtrate resistivity having been adjusted by the addition of the lithium salt such as lithium citrate in the manner described, the electric logging of the well follows, either more or less immediately, or after a time interval during which drilling of a section of hole to be logged may intervene, or the lithium citrate treated fluid may simply be allowed to stand in the well, as for example from a period of from hours to days or even weeks, after which the electric logging desired is accomplished.

A block diagram showing the sequence of steps in accordance with the invention is given below:

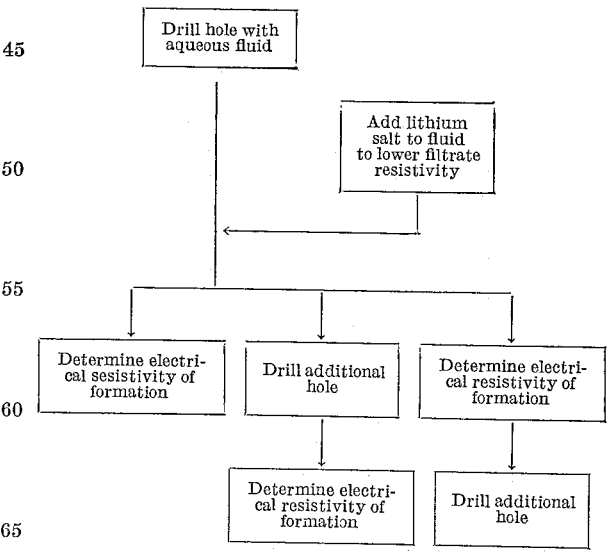

In the above diagram, the sequence of steps takes place downwardly, and three alternatives are shown following the first two steps, all in accordance with the explanation which has just been given.

By way of comparison, it may be stated that as a general rule, it is not possible, by addition of salt to lower mud filtrate resistivity, as measured at 75° F., to anywhere near 1 to 1.5 ohm meters, without severe flocculation of the mud, followed by the development of a high filtrate loss. As a specific example, in a particular mud made from California desert dry lake clays and Wyoming bentonite having a filtrate resistivity of 3.2 ohm meters at 75° F., the filtrate resistivity was lowered to approximately 0.45 ohm meter by the addition of 12 lbs. per barrel of lithium citrate (anhydrous basis); the viscosity of the mud remained virtually unchanged, and was 16 centipoises with an initial gel strength of 8 grams, all as measured on the Stormer viscometer in accordance with American Petroleum Institute Code 29. Another sample of the same mud when treated with 5 lbs. of sodium chloride per barrel to yield a like mud filtrate resistivity, became buttery in consistency, with a Stormer viscosity of 105 centipoises and an initial gel of 195, and was thus totally unfit for drilling.

Lithium citrate is commercially available in the form of crystals containing four molecules of water of crystallization. The commercial salt thus comprises approximately 74% lithium citrate and 26% water. The examples given herein are on the basis of anhydrous lithium citrate.

I prefer lithium citrate, and, moreover, this is the best lithium salt which I know of for carrying out the invention. It is, moreover, commercially available in large quantity. Accordingly, this specification has been largely in terms of lithium citrate as the resistivity lowering agent used. It will be understood, however, that there are a number of close equivalents for lithium citrate which may also be used, either by themselves or in admixture with each other and with lithium citrate itself. In order to be substitutable in whole or part for lithium citrate in carrying out this invention, such other lithium salt must be freely water soluble, and the anion must have a deflocculating effect upon clay-water suspensions. In general, lithium salts of acids which are polybasic and have, additionally, hydroxyl groups, and form soluble salts with lithium, are usable. Such other lithium salts as are known to me as equivalents for lithium citrate for the purposes of this invention are: lithium gluconate; lithium acetate; lithium metaphosphate; lithium lactate; lithium glycolate; lithium fumarate; lithium adipate; lithium hydracrylate; lithium malate; lithium tartrate; lithium borate; and lithium saccharate. (A synonym for lithium hydracrylate is lithium β-hydroxypropionate.)

As is well known, aqueous drilling muds are those containing water as the fluid phase. They will in general also contain clays, including bentonites, although not invariably; and may contain weighting materials, oil emulsified therein, and other additives common in the art. Such muds are well known to those skilled in the art, and may be called simply "aqueous drilling fluids."

In some cases, it may happen that a well will be drilled with an aqueous drilling fluid, whereupon it is treated in accordance with the invention, logging ensues, and the mud is then discarded, the well having been completed. Thus, the treated fluids might be termed in such an instance placement fluids.

In general, my invention will be used where it is desired to reduce the mud filtrate resistivity to the range 1½ to 0.2 ohm meters, the mud often having a higher filtrate resistivity than the upper limit. However, in many cases, it will happen that a mud already has a filtrate resistivity within this range, for example 0.9 ohm meter, and cannot be treated by heretofore known methods to give a lower filtrate resistivity, such as for example 0.5 ohm meter, which may be required for logging. My invention is applicable to such a case as well.

Broadly speaking the advantages of the invention are found when from 2 lbs. to 30 lbs. of lithium citrate or its equivalent are added per barrel of drilling fluid or placement fluid, as the case may be.

It will be apparent that the invention is a broad one, and much variation of ingredients, quantities and procedure is permissible within the broad scope of the invention and of the claims which follow. Resistivities referred to herein are to be understood as measured at a standard temperature of 75° F.

This application is a continuation-in-part, that is, a continuation as to common subject matter, of my co-pending application Serial No. 668,899, filed July 1, 1957.

What I claim is:

1. In a method of logging wells which includes the steps of drilling a bore hole by means of an aqueous drilling fluid containing a burden of dispersed mineral matter subject to flocculation by the addition of salt and of determining subsequent to such drilling selected electrical characteristics in the well thus formed: the steps of adding a lithium salt chosen from the group consisting of lithium citrate; lithium gluconate; lithium acetate; lithium metaphosphate; lithium lactate; lithium glycolate; lithium fumarate; lithium adipate; lithium hydracrylate; lithium malate; lithium tartrate; lithium borate; and lithium saccharate, and mixtures thereof to said drilling fluid so as to substantially reduce the electrical resistivity of the filtrate thereof to within the range of 0.2 to 1.5 ohm meters but without flocculating the said drilling fluid and subsequently determining the electrical resistivity of the formation surrounding selected portions of said bore hole.

2. The process of claim 1 wherein from 2 to 30 pounds of said lithium salt are added to each barrel of said fluid.

3. In a method of logging wells which includes the steps of drilling a bore hole by means of an aqueous drilling fluid containing a burden of dispersed mineral matter subject to flocculation by the addition of salt and of determining subsequent to such drilling selected electrical characteristics in the well thus formed: the steps of adding lithium citrate to said drilling fluid so as to substantially reduce the electrical resistivity of the filtrate thereof to within the range of 0.2 to 1.5 ohm meters but without flocculating the said drilling fluid and subsequently determining the electrical resistivity of the formation surrounding selected portions of said bore hole.

4. The process of claim 3 wherein from 2 to 30 pounds of lithium citrate are added to each barrel of said fluid.

5. The method of determining characteristics of subterranean formations during the course of drilling a well therethrough which includes the steps of drilling a bore hole by means of an aqueous drilling fluid containing a burden of dispersed mineral matter subject to flocculation by the addition of salt, adding a lithium salt chosen from the group consisting of lithium citrate; lithium gluconate; lithium acetate; lithium metaphosphate; lithium lactate; lithium glycolate; lithium fumarate; lithium adipate; lithium hydracrylate; lithium malate; lithium tartrate; lithium borate; and lithium saccharate, and mixtures thereof to said drilling fluid so as to substantially reduce the electrical resistivity of the filtrate thereof to within the range of 0.2 to 1.5 ohm meters but without flocculating the said fluid, and the further steps without regard to chronological sequence of subsequently determining the electrical resistivity of the formation surrounding selected portions of said bore hole and of continuing drilling with the said so-treated drilling fluid.

6. The process of claim 5 wherein from 2 to 30 pounds of said lithium salt are added to each barrel of said fluid.

7. The method of determining characteristics of subterranean formations during the course of drilling a well therethrough which includes the steps of drilling a bore hole by means of an aqueous drilling fluid containing a burden of dispersed mineral matter subject to flocculation by the addition of salt, adding lithium citrate to said drilling fluid so as to substantially reduce the electrical resistivity of the filtrate thereof to within the range of 0.2 to 1.5 ohm meters but without flocculating the said fluid, and the further steps without regard to chronological sequence of subsequently determining the electrical resistivity of the formation surrounding selected portions of said bore hole and of continuing drilling with the said so-treated drilling fluid.

8. The process of claim 7 wherein from 2 to 30 pounds of lithium citrate are added to each barrel of said fluid.

References Cited in the file of this patent

UNITED STATES PATENTS

| | | |
|---|---|---|
| 1,889,889 | Ennis | Dec. 6, 1932 |
| 2,364,957 | Douglas | Dec. 12, 1944 |
| 2,717,239 | Fischer | Sept. 6, 1955 |
| 2,931,772 | Brukner | Apr. 5, 1960 |
| 2,973,320 | Brukner | Feb. 28, 1961 |

FOREIGN PATENTS

| | | |
|---|---|---|
| 464,872 | Canada | May 2, 1950 |